UNITED STATES PATENT OFFICE 1,944,437

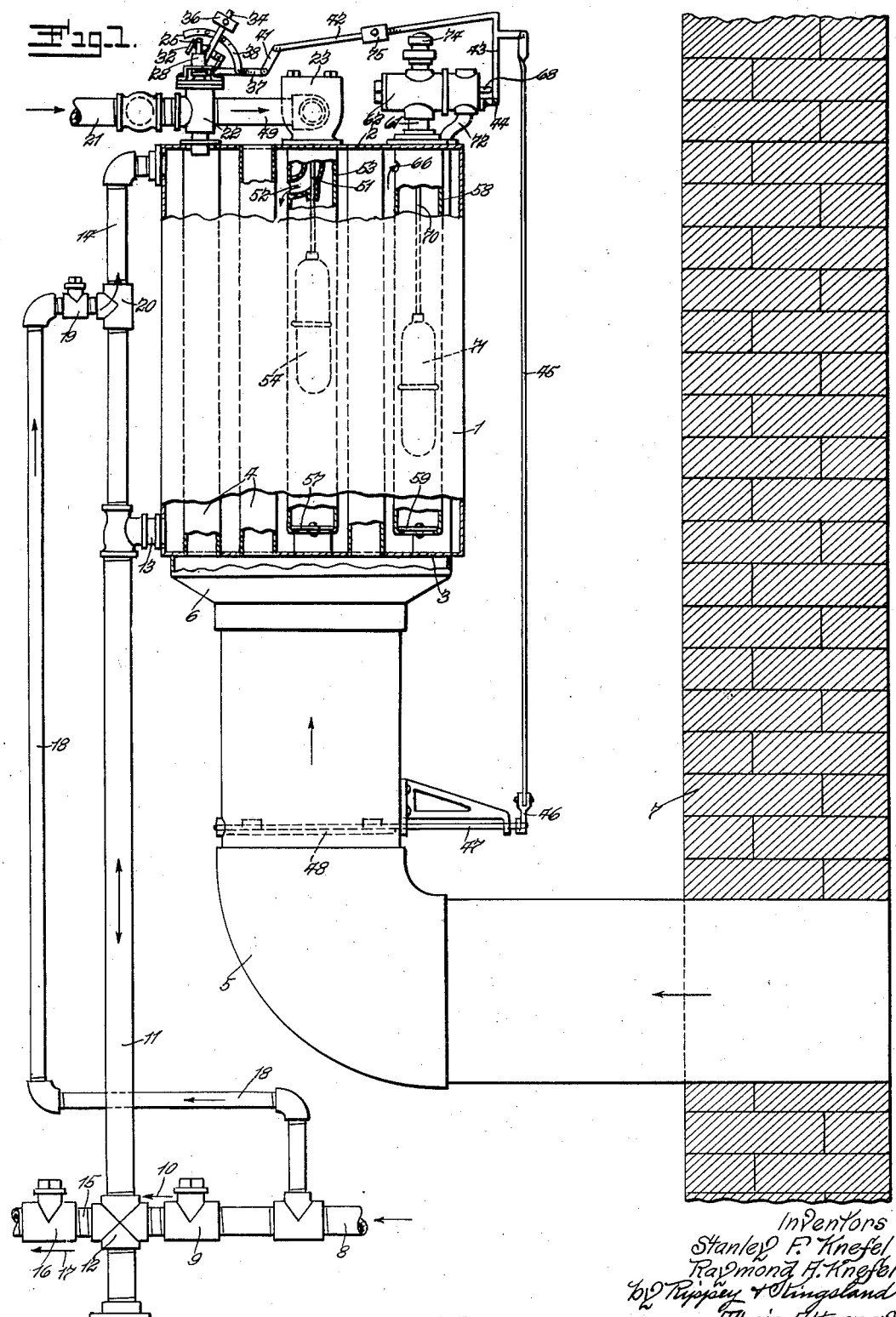

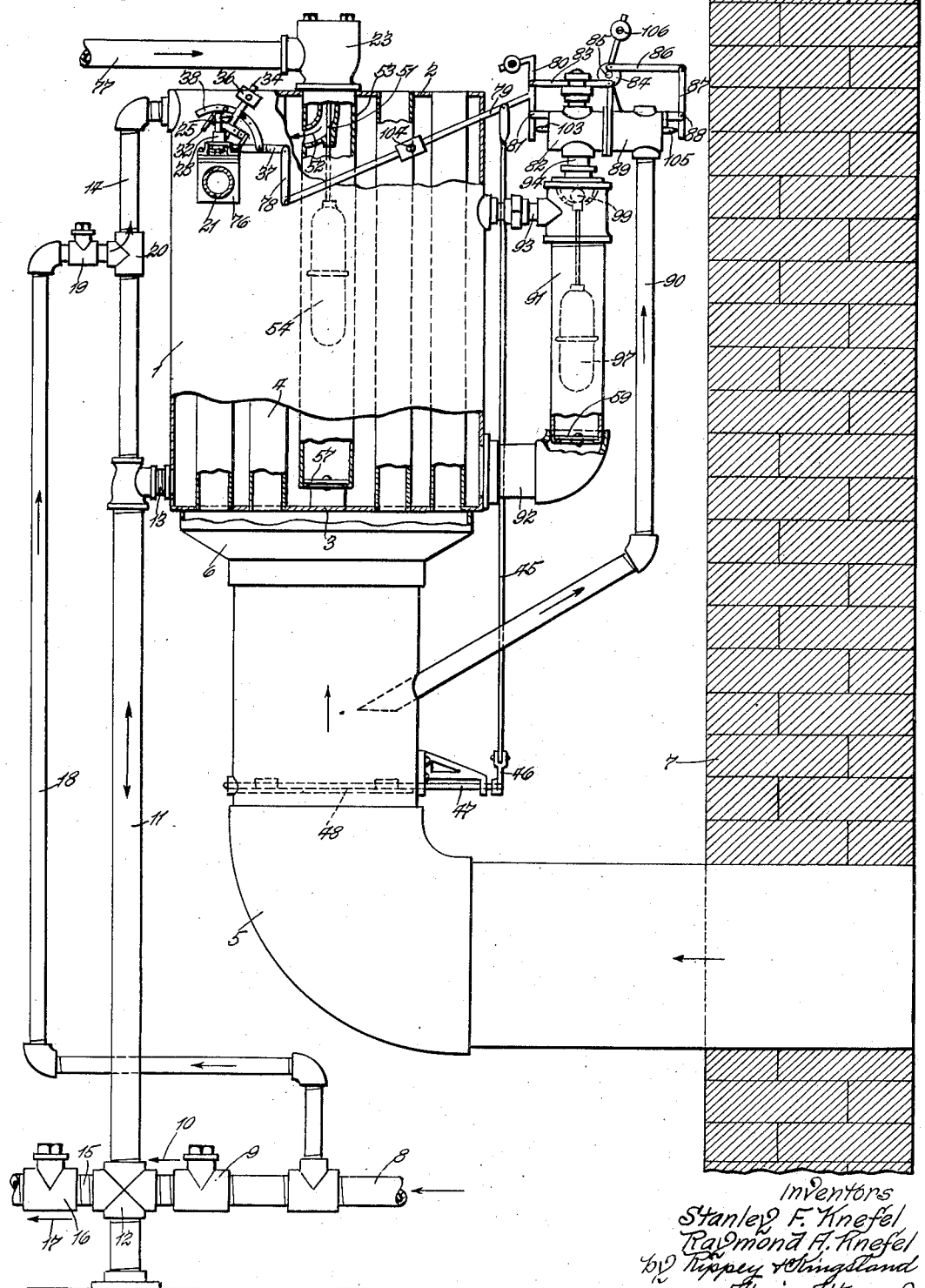

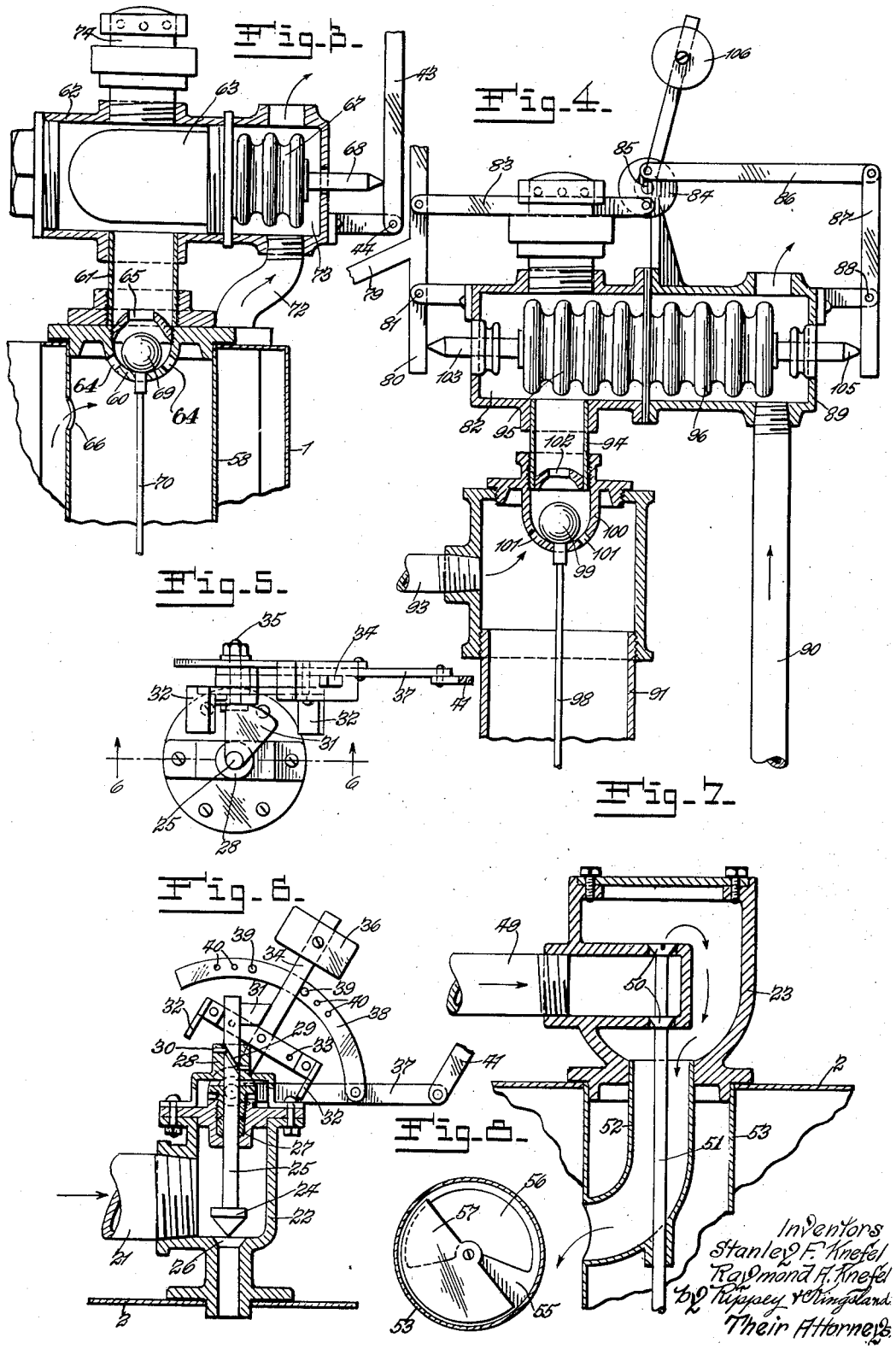

BOILER RETURN AND VACUUM TRAP

Stanley F. Knefel and Raymond A. Knefel, St. Louis, Mo.

Application August 10, 1933. Serial No. 684,528

6 Claims. (Cl. 103—252)

This invention relates to improved boiler return and vacuum trap for use in association with steam boilers to control the return to the boiler of water obtained by condensation of steam in a system in which steam is supplied by a boiler.

An object of this invention is to provide a boiler return and vacuum trap having improved means for causing condensation of steam in the trap and for controlling the ejection of the water resulting from such condensation and causing the water to return to the boiler. Improved valve devices are provided in connection with the trap and are controlled automatically during operation and use of the device in such a way as to cause the device to function automatically in effecting condensation of the steam and ejecting the water of condensation from the trap to the boiler; and another object of the invention is to improve and simplify this valve mechanism.

Other objects of the invention will appear from the following description, reference being made to the annexed drawings, in which—

Fig. 1 is a side elevation with parts in section showing a preferred form of the invention.

Fig. 2 is a similar view of an alternative arrangement designed for use in rooms or places of less height than the rooms or places in which the device shown in Fig. 1 may be satisfactorily used.

Fig. 3 is an enlarged sectional view showing an actuator for operating the valve controlling the admission of steam into the trap of Fig. 1.

Fig. 4 is a similar sectional view showing the means for operating the valve controlling the admission of steam into the trap of Fig. 2.

Fig. 5 is a plan view of the valve structure controlling the admission of steam into the trap.

Fig. 6 is a sectional view on the line 6—6 of Fig. 5.

Fig. 7 is an enlarged sectional view of the steam inlet valve contained in the device shown in Fig. 2.

Fig. 8 is an enlarged sectional view of one of the float chambers showing the valve controlling the admission and outflow of water therefrom.

As shown in Fig. 1, the condenser tank 1 has a top wall 2 and a bottom wall 3. A plurality of vertical flues 4 open through the top and bottom walls of the condenser tank.

A draft tube 5 which may be extended to any cool or cold place to receive cool or cold air is connected with the lower end wall 3 of the tank by an enlarged funnel connection 6. As shown, the draft tube 5 opens through a building wall 7 so as to receive air from the outside of the building. Within the tank 1 the flues 4 are spaced from each other so that their outer surfaces are fully exposed to any steam which may enter the condenser tank. The upper ends of the flues 4 are open to atmosphere, thus providing an arrangement whereby, when steam is admitted into the condenser tank, air will freely pass through the draft tube 5 and upwardly through the flues 4, due to the heating action of the steam, and the steam in the condenser tank will be condensed thereby.

A return pipe 8 from the system to which steam is supplied by the boiler is adapted to return water produced by condensation of steam in said system. A check valve 9 in the pipe 8 permits water to flow in the direction of the arrow 10 and prevents the water from flowing in the opposite direction. The pipe 8 communicates with a pipe 11 through a fitting 12, and the pipe 11 has a branch 13 opening into the lower end of the condenser tank 1 and an extension 14 opening into the upper end of the condenser tank. A pipe 15 opens from the fitting 12 and is adapted to return water from the condenser tank 1 to the boiler (not shown) and is equipped with a check valve 16 permitting water to flow in the direction of the arrow 17 and preventing water from flowing in the opposite direction.

A pipe 18 has one end opening into the pipe 8 beyond the influent side of the valve 9 and has its opposite end opening into the extension 14 of the pipe 11 and equipped with a check valve 19, permitting water to flow in the direction of the arrow 20 and preventing water from flowing in the opposite direction through the pipe 18. A pipe 21 conducts steam from the boiler (not shown) and is adapted to discharge live steam into the condenser tank 1 through the valve housing 22 (Fig. 6) and through a second valve housing 23 (Fig. 7).

The discharge of live steam into the condenser tank 1 through the valve housing 22 is controlled by a valve 24 attached to the end of a stem 25 and movable from and to a valve seat 26 in order to open and to close communication from the pipe 21 into the condenser tank. The valve stem 25 is mounted for longitudinal and turning movements in a packing device 27 and in a bearing 28 outwardly beyond said packing device. The valve stem 25 is formed with a winding or spiral groove 29 into which the inner end of a pin 30 supported by the bearing 28 extends. Thus, when the valve stem 25 is turned in one direction, it will be moved longitudinally and thereby move the valve 24 from the valve seat 26 and, when said stem is turned in the opposite direction, it will be moved longitudinally in a direction to place the valve 24 upon the valve seat 26 and thereby prevent passage of steam from the pipe 21 into the condenser tank through the valve housing 22.

An arm 31 is rigid with the outer end of the valve stem 25 and extends between and is adapted to be engaged and operated by arms 32 rigid with and projecting from a bracket 33 attached to a swinging actuator lever 34. The lower end of the lever 34 is mounted on a pivot 35 (Fig. 5) projecting laterally from the valve housing 22. A weight 36 is attached to the upper end of the lever 34 and functions as an actuator to impart final movements to said lever 34 when said lever is moved in either direction beyond vertical position.

When said lever 34 is moved it carries the bracket arms 32 therewith, causing one or the other of said arms to engage and operate the arm 31 and thus impart turning and longitudinal movements to the valve stem 25, as required to open and to close the valve 24.

A lever 37 has one end mounted on the pivot 35 in a manner to permit operation of said lever 37 by the operating connections provided for that purpose. Appropriate longitudinal or sliding movements of the lever 37, if such movements are required, may be permitted by providing a slot in said lever 37 to receive the pivot 35. An arcuate arm 38 is rigidly attached to the lever 37 and supports projections 39 adapted to engage opposite sides of the arm 34 to move said arm in opposite directions, as required to open and to close the valve 24. These projections 39 may be mounted in different positions along the arm 38, as in holes 40 provided for that purpose.

One end of the lever 37 is connected with one end of a link 41, the opposite end of which is connected with the end of an arm 42 constituting a part of an angular lever, including also an arm 43 mounted upon a pivot 44. A link 45 has its upper end pivotally connected with the arm 43 and its lower end pivotally connected with an arm 46 attached to the spindle 47 of a butterfly valve device 48 mounted in the tubular air intake 5, so that said valve device 48 will be opened and closed by operation of the lever 42—43.

A pipe 49 branching from the pipe 21 in advance of the valve housing 22 opens into the valve housing 23. Valves 50 attached to a valve stem 51 control passage of steam from the branch pipe 49 into the valve housing 23. From the valve housing 23 a pipe 52 (Fig. 7) opens into the condenser tank 1 through the wall of a float chamber 53 downwardly into which the valve stem 51 extends. A float device 54 (Fig. 1) is attached to the lower end of the valve stem 51 within the float chamber 53 and constitutes means for moving the valves 50 upwardly from their valve seats to permit live steam to pass from the pipe 49 into and through the valve housing 23 and thence through the pipe 52 into the condenser tank 1 when water rises to a predetermined height in the float chamber 53 and raises the float 54.

The lower end wall 55 of the float chamber 53 has an opening 56 (Fig. 8) controlled by a rotary plate valve 57 which is adjustable to vary the size of the opening 56 and thus vary the speed of flow of water into and from the float chamber 53. Thus, by adjustment of the valve 57, water may be admitted into the float chamber 53 in smaller volume than water is admitted into the condenser tank 1 from the pipes 11 and 18; and, similarly, the water may be caused to flow from the float chamber 53 in less volume than the water flows from the condenser tank 1 through the pipe 11.

A float chamber 58 similar to the float chamber 53 and having a valve 59 similar to the valve 57 controlling flow of water into and out of said float chamber, has its upper end communicating through a valve cage 60 (Fig. 3) and a pipe 61 with a chamber 62 enclosing an expandible and contractible thermostatic device 63 of known or conventional construction. Ports 64 open from the float chamber 58 into the valve cage 60, and a port 65 opens from the valve cage 60 into the pipe 61. An opening 66 near the upper end of the float chamber 58 permits steam to enter the upper portion of said chamber even though the lower end of said chamber be immersed in and sealed by water. A bellows element 67 is connected with the thermostatic device 63 and actuated thereby and is in connection with an abutment 68 having its outer end adjacent to the arm 43 of the angular lever 42—43 so that, when the thermostatic device moves the element 68 outwardly, the arm 43 will be moved outwardly, operating the link 45 to open the valve 48 and operating the connections 42—41 to operate the lever 37 in a direction to raise the end of the lever 37 and thereby operate the arm 34. This operation of the arm 34 by the raising of the end of the lever 37 that is connected with the link 41 will turn the valve stem 25 in a direction to close the valve 24 and thus prevent steam from passing from the pipe 21 through the valve housing 22 into the condenser tank. The valve 24 is thus closed automatically and as an incident to the heating of the thermostatic device 63 to a predetermined degree of heat by steam entering the chamber 62.

A valve 69 is mounted in the cage 60. The upper end of a rod 70 is connected with said valve and the lower end of said rod is connected with a float 71 in the float chamber 58. The float 71 extends downwardly a considerable distance below the float 54, so that said float 71 will be raised by the water in the condenser tank 1 to cause the valve 69 to close the port 65 before the float 54 is operated to open the valves 50. A pipe 72 opens from one of the flues 4 into the chamber 73 that confines the bellows actuator 67, so that the cooling draft of air is circulated against the bellows 67 when the valve 48 is open. An air exhaust device 74 of known construction is attached to the chamber 62 to permit air to be discharged from said chamber 62 when steam enters said chamber.

In operation, water will flow through the pipe 8, valve 9, pipe 11 and connection 13 into the lower end of the tank 1. The actuator weight 75 on the lever arm 42 holds said arm in position in which the valve 24 is normally open. Water rising in the tank 1 eventually causes the float 71 to close the valve 69 while a cooling current of air continues to pass through the pipe 72 to cool the bellows 67. If water continues to rise in the tank 1, due to failure of the valve 24 to open, the water will raise the float 54 to open the valves 50 and admit a full pressure of live steam into the tank 1 through said valves 50 even if the valve 24 remains closed. This full pressure of live steam forces water from the tank 1 through the connection 13 into the pipe 11 and through the pipe 15 to the boiler. When the water is ejected from the tank 1, the valves 50 are eventually closed by the downward movement of the float 54, and the valve 69 is eventually opened by the downward movement of the float 71, and the cycle of operation is then repeated.

In the arrangement shown in Figs. 2 and 4, a valve housing 76 similar to the valve housing 22 opens through the side wall of the tank 1 and is mounted below the top wall 2 of said tank. The live steam pipe 21 opens into this valve housing 76 and has a branch 77 similar to the branch 59 opening into the valve housing 23, already described. The valve in the housing 76 and the equipment for operating said valve are the same as the valve 24 and equipment for operating said valve 24 up to and including the lever 37.

In the construction shown in Fig. 2, the outer end of the lever 37 is connected by a link 78 the lower end of which is connected with one end of an arm 79, the opposite end of said arm 79 being rigid with an angular arm 80 mounted on a pivot 81 projecting from the thermostatic chamber 82. A link 83 connects the arm 80 eccentrically with a disc or crank 84, rotative on a support 85. A diametrically opposite portion of the crank disc 84 is connected by a link 86 with a lever 87 mounted on a pivot 88 supported by the housing portion 89. A pipe 90 opens into the housing portion 89 and into the air inlet tube 5 at the effluent side of the valve 48, so that there will be a cooling draft of air through the chamber 89 when the valve 48 is open.

A float chamber 91 similar to the float chamber 58 has communication 92 at its lower end with the inside of the tank 1 and communication 93 at its upper end with the inside of the upper portion of the tank 1. The upper end of the float chamber 91 communicates through a passage 94 with the inside of the chamber 82 which encloses a thermostatic device 95, while the chamber 89 encloses a thermostatic device 96. The float 97 in the float chamber 91 is connected by a rod 98 with a valve 99 in the valve cage 100 having ports 101 opening into the float chamber 91 and a port 102 opening into the pipe 94. The thermostatic device 95 has an abutment 103 engaging the lower end of the lever 80 below the pivot 81 and, on expansion of the thermostatic device 95, will operate said lever 80 to close the valve in the housing 76 and prevent live steam from passing from the pipe 21 into the tank 1. A weight 104 on the arm 79 operates said arm in a direction to open the valve in the housing 76. An abutment 105 in connection with the thermostatic device 96 engages the lever 87 and cooperates with the thermostatic device 95 to open and to close the valve in the housing 76.

A counter-balance weight 106 supported in connection with the pivot 85 cooperates with the link connections 83 and 86 to impart final movements to the crank disc 84 in the operations thereof to open and to close the valve in the housing 76.

The thermostatic devices 95 and 96 are in cooperative relation but each will, to an extent, control the other through the connections therefrom to the crank disc 84. This makes the operation more definite and certain under some conditions than if reliance is placed upon a single thermostatic device to control operation of the arm 75 and the parts controlled thereby.

The description of the operation of the mechanism illustrated in Figs. 1, 3, 5, 6 and 7 is deemed a sufficient description of the operation of this mechanism shown in Fig. 2, and repetition of the mode of operation is believed to be unnecessary.

It is now apparent that our invention is a compact and simplified device for returning to the boiler water obtained by condensation of steam in the system to which steam is supplied from the boiler. The arrangement and location of the parts may be varied otherwise than as specifically described without departure from the nature and principle of the invention, and we do not restrict ourselves in this particular.

We claim:

1. A device of the character described comprising a combined condenser and vacuum trap, a valve for admitting live steam into said condenser and trap, a pipe for discharging water into and conducting water from said condenser and trap, a thermostatic device, connections from said thermostatic device to said valve for opening and closing said valve, and a valve operated by water discharged into said tank from said pipe controlling operation of said thermostatic device.

2. A device of the character described comprising a tank having vertical flues opening through the upper and lower ends thereof, a valve controlling admission of live steam into said tank, means for discharging water into and conducting said water from said tank, a valve controlling passage of air through said flues, a thermostatic device, connections operated by said thermostatic device for operating both of said valves, and a valve operated by the water entering said tank from said pipe controlling operation of said thermostatic device.

3. A device of the character described comprising a tank having flues extending therethrough, a pipe for admitting water into and conducting water from said tank, a valve member controlling passage of air through said flues, a valve device controlling admission of live steam into said tank to eject said water from said tank, a thermostatic device, a second valve device for admitting live steam into said tank to operate said thermostatic device when said tank contains a predetermined amount of water, connections from said thermostatic device for closing said first valve device, and means for operating said connections to open said first valve device.

4. A device of the character described comprising a tank having flues extending therethrough, a pipe for admitting water into and conducting water from said tank, a valve member controlling passage of air through said flues, a valve device controlling admission of live steam into said tank to eject said water from said tank, a thermostatic device, a second valve device for admitting live steam into said tank to operate said thermostatic device when said tank contains a predetermined amount of water, connections from said thermostatic device for closing said first valve device, means for operating said connections to open said first valve device, and means operated by said connections controlling passage of air through said tank.

5. A device of the character described comprising a tank having flues opening through the ends thereof, a pipe for discharging water into and conducting said water from said tank, a valve controlling admission of live steam into said tank to eject said water from said tank, a thermostatic device, a valve controlling admission of steam to said thermostatic device to operate the same, connections from said thermostatic device for closing said first named valve, means for closing said second named valve by water that has entered said tank, a float device, a valve operated by said float device and controlling admission of live steam into said tank, and means operated by said connections controlling passage of air through said flues and into contact with said thermostatic device.

6. A device of the character described comprising a tank, a pipe for discharging water into the lower end of said tank and conducting said water from said tank, an additional pipe for discharging water into the upper end of said tank, a valve controlling admission of live steam into said tank to eject said water therefrom, a thermostatic device, connections operated by said thermostatic device for closing said valve, means for operating said connections to open said valve, a valve controlling passage of steam from said tank to said thermostatic device, means operated by water entering said tank for closing said last named valve, and means operated by said connections controlling passage of air through said tank and into contact with said thermostatic device.

STANLEY F. KNEFEL.
RAYMOND A. KNEFEL.